(12) United States Patent
Blaylock et al.

(10) Patent No.: US 11,566,894 B2
(45) Date of Patent: Jan. 31, 2023

(54) SYSTEMS AND METHODS FOR GENERATING A TWO-DIMENSIONAL MAP

(71) Applicant: FLIR Unmanned Aerial Systems ULC, Vancouver (CA)

(72) Inventors: April Deirdre Blaylock, Kitchener (CA); Richard Patrick Ribeiro Cunha, Mississauga (CA); Kuan-Yao Huang, Guelph (CA)

(73) Assignee: FLIR Unmanned Aerial Systems ULC, Vancouver (CA)

( * ) Notice: Subject to any disclaimer, the term of this patent is extended or adjusted under 35 U.S.C. 154(b) by 0 days.

(21) Appl. No.: 17/070,845

(22) Filed: Oct. 14, 2020

(65) Prior Publication Data

US 2021/0108919 A1   Apr. 15, 2021

Related U.S. Application Data

(60) Provisional application No. 62/915,424, filed on Oct. 15, 2019.

(51) Int. Cl.
| | |
|---|---|
| *G01C 11/00* | (2006.01) |
| *H04N 5/232* | (2006.01) |
| *G06T 3/40* | (2006.01) |
| *B64C 39/02* | (2006.01) |
| *B64D 47/08* | (2006.01) |
| *H04N 5/265* | (2006.01) |

(52) U.S. Cl.
CPC ............ *G01C 11/00* (2013.01); *B64C 39/024* (2013.01); *B64D 47/08* (2013.01); *G06T 3/4038* (2013.01); *H04N 5/23203* (2013.01); *H04N 5/23299* (2018.08); *H04N 5/265* (2013.01); *B64C 2201/027* (2013.01); *B64C 2201/127* (2013.01)

(58) Field of Classification Search
None
See application file for complete search history.

(56) References Cited

U.S. PATENT DOCUMENTS

| | | | |
|---|---|---|---|
| 10,012,735 B1* | 7/2018 | Loveland | B64C 39/024 |
| 2012/0200702 A1* | 8/2012 | Wilson | G01C 11/02 348/144 |
| 2015/0347872 A1* | 12/2015 | Taylor | G06K 9/00637 382/224 |
| 2016/0313736 A1* | 10/2016 | Schultz | G06T 11/60 |
| 2017/0206648 A1* | 7/2017 | Marra | G01C 21/20 |
| 2018/0130196 A1* | 5/2018 | Loveland | B64C 39/024 |
| 2018/0330528 A1* | 11/2018 | Loveland | G06F 3/04845 |
| 2019/0118945 A1* | 4/2019 | Loveland | G05D 1/0202 |
| 2020/0103552 A1* | 4/2020 | Phelan | G05D 1/1062 |
| 2020/0159252 A1* | 5/2020 | Giuffrida | G01C 15/00 |
| 2021/0117583 A1* | 4/2021 | Strong | G06F 30/13 |

* cited by examiner

*Primary Examiner* — Heather R Jones
(74) *Attorney, Agent, or Firm* — Haynes and Boone, LLP

(57) ABSTRACT

A system, computer-implemented method and non-transitory computer readable medium storing instructions for generating a two-dimensional (2D) map of an area of interest are provided. The system comprises a processor and memory storing instructions which when executed by the processor configure the processor to perform the method. The method comprises determining a perimeter of an area of interest, obtaining nadir images of the area of interest, obtaining at least one oblique image of the area of interest from at least one corner of the perimeter, and processing the nadir and oblique images together to form the 2D map of the area of interest.

20 Claims, 18 Drawing Sheets

Overlaps as Shown in a PIX4D Quality Report

Overlaps as Shown in a PIX4D Quality Report

SYSTEMS AND METHODS FOR GENERATING A TWO-DIMENSIONAL MAP

CROSS REFERENCE TO RELATED APPLICATIONS

This application claims the benefit of and priority to U.S. Provisional Patent Application No. 62/915,424 filed Oct. 15, 2019 and entitled "SYSTEMS AND METHODS FOR GENERATING A TWO-DIMENSIONAL MAP," which is incorporated herein by reference in its entirety.

FIELD

This disclosure generally relates to the fields of unmanned vehicles and two-dimensional (2D) mapping, and in particular to a system and method for generating a 2D map using an unmanned vehicle.

BACKGROUND

An unmanned aerial vehicle (UAV) does not have a human operator located at the UAV. A UAV may include various components such as sensors and measurement and navigation instruments. A UAV may carry a payload (e.g., a camera) which may be configured to perform specific duties such as taking aerial photographs and videos.

Two-dimensional (2D) mapping has many useful applications, from accident scene reconstruction to site surveys and area maps. Often, 2D maps are generated by stitching together nadir imagery. However, there are inaccuracies in distance measurements in models generated by stitching nadir imagery together collected by an unmanned vehicle whilst completing a two-dimensional (2D) mapping mission.

SUMMARY

In accordance with some embodiments, there is provided a system for generating a two-dimensional (2D) map of an area of interest. The system comprises a processor, and a memory storing machine-readable instructions that when executed by the processor configure the processor to determine a perimeter of an area of interest, obtain nadir images of the area of interest; obtain at least one oblique image of the area of interest from at least one corner of the perimeter, and process the nadir and oblique images together to form the 2D map of the area of interest.

In accordance with some embodiments, there is provided a computer-implemented method of generating a two-dimensional (2D) map of an area of interest. The method is performed by a processor and comprises determining a perimeter of an area of interest, obtaining nadir images of the area of interest, obtaining at least one oblique image of the area of interest from at least one corner of the perimeter, and processing the nadir and oblique images together to form the 2D map of the area of interest.

In accordance with some embodiments, there is provided a non-transitory computer readable medium for storing instructions which when executed by a processor configure the processor to determine a perimeter of an area of interest, obtain nadir images of the area of interest, obtain at least one oblique image of the area of interest from at least one corner of the perimeter, and stich the nadir and oblique images together to form the 2D map of the area of interest.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

Embodiments will be described, by way of example only, with reference to the attached figures, wherein in the figures.

It is understood that throughout the description and figures, like features are identified by like reference numerals.

DETAILED DESCRIPTION

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various example embodiments described herein.

The term unmanned vehicle (UV) is used herein and may include an unmanned aerial vehicle (UAV), an unmanned aircraft (UA), an unmanned aquatic vessel, an unmanned ground vehicle (UGV), and any other vehicle or structure which maybe unmanned, operate autonomously or semi-autonomously, and/or controlled remotely. The UGV may be a remotely controlled, autonomous or semi-autonomous vehicle system which is comprised of a main body and a drive system supported by the main body. In some examples, the drive system is comprised of a propulsion system, such as a motor or engine, and one or more tracks or wheels. Other arrangements, such as a rail or fixed-track ground vehicle, a tether or rope-pulled ground vehicle without a motor or engine, a ground vehicle using balls, sleds or rails, and a ground vehicle which hovers but navigates in proximity to terrain, are also contemplated herein.

Some of the features taught herein are described with reference to embodiments of a UAV having a camera as a payload by way of example only. However, the description and features may also apply generally to any UV having a camera that may extend an aerial distance above the ground.

"Mapping" may refer to the practice of navigating a UV such that a camera payload is over a given area taking numerous downward facing pictures, which will then later be 'stitched' together to form a complete and singular scene (or model as it is commonly referred to a Mapping software)—known as 'photogrammetry'. The terms "mapping software", "image processing software" and "image mapping software" may be used interchangeably. UAV control software (e.g., FLIR's Mission Control Software (MCS)) may have a built-in feature to complete mapping missions (e.g., FLIR's Autogrid software) that will work out the optimum path to complete a mapping mission with the prescribed overlaps, taking pictures periodically (e.g., every 8 seconds by default). Faster speeds are available should it be required that the mission is completed quicker. For example, FLIR's SkyRanger R70 can take images as fast as every 2 seconds during a mapping mission should a quicker time to completion be required.

Figure 1:
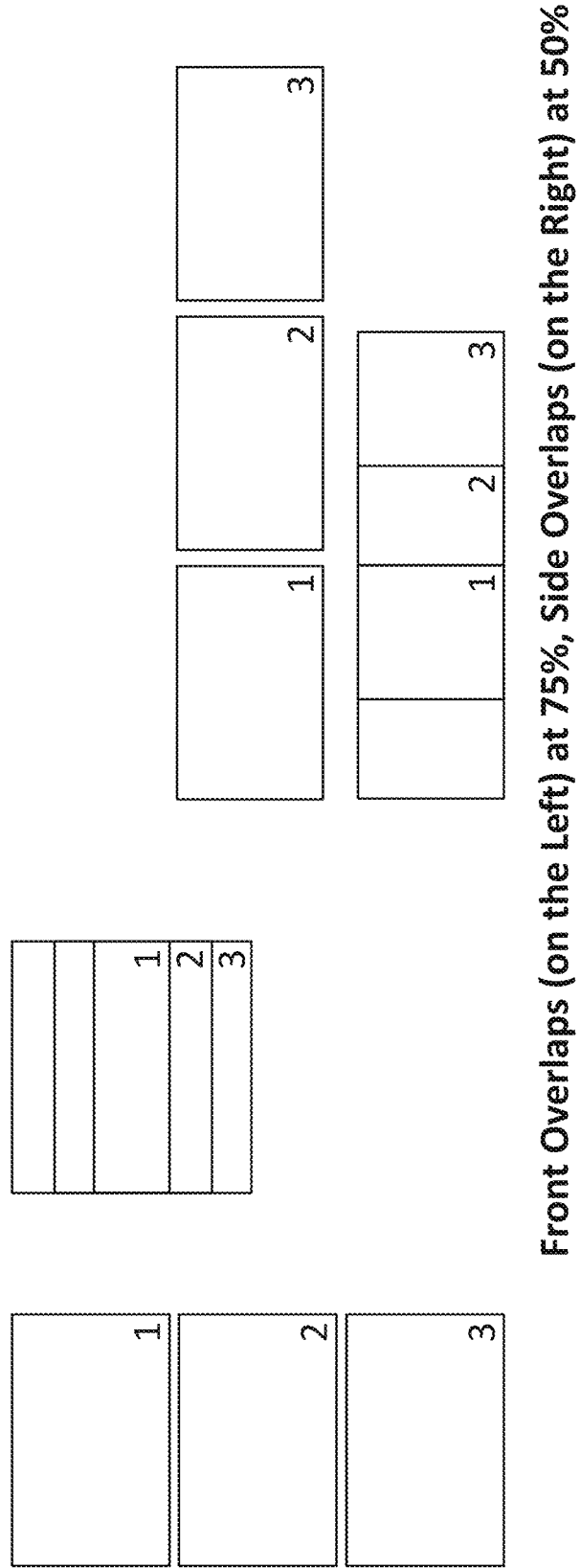
FIG. 1 illustrates examples of overlap of images.

FIG. 1 illustrates examples of overlap of images. "Overlap" refers to the amount of overlap in the images, referred to as "front overlap" and "side overlap" as shown in FIG. 1. Default overlaps for the FLIR SkyRanger in Autogrid mode are 75/50, which is read as 75% overlap on images (front) and 50% overlap on the images (side)—see FIG. 1. These overlaps are used by an image processing or photogrammetry stitching software to pick out the same point in several images, a process known as "triangulation". The more images where the software can see the same point, the better. Points at the edges of the grid pattern will have less points that are matched across multiple images.

Getting a high quality and accurate "stitch" in an image processing may rely on several factors. Good overlaps will allow the image processing to see the same item in multiple images. However, there is a law of diminishing returns. Although slightly counter-intuitive, too much overlap can have negative effects. Also, some image processing techniques use locking features (i.e., the same item that is easily visible in several images). These are called "tie points" where the image processing can tie images together based on location features in those images.

Figure 2:
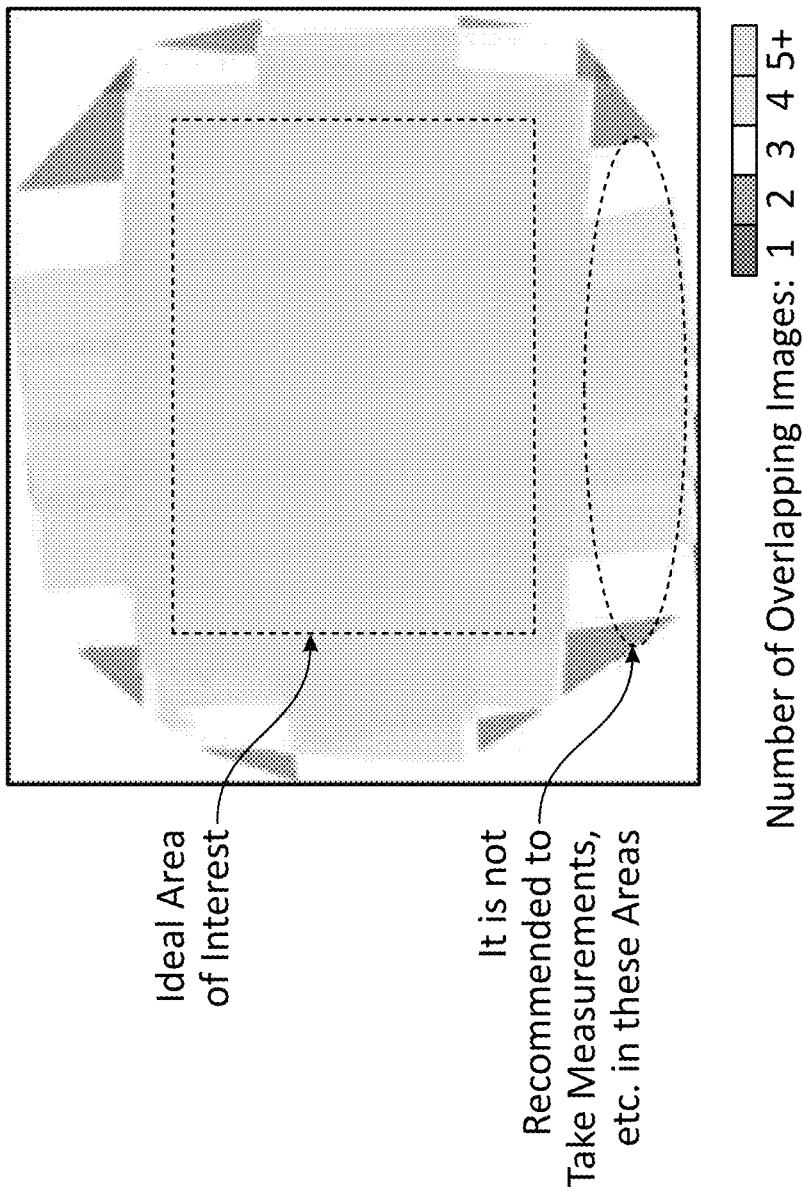
FIG. 2 illustrates overlaps as shown in an image processing software report, in accordance with some embodiments.

FIG. 2 illustrates overlaps as shown in an image processing software report. Given that image processing software may rely on being able to see the same point in multiple images (e.g., "triangulation") the pilot should take this into account when planning an image flight path (e.g., an autogrid mission). The pilot should ensure the area of interest is well within the prescribed area. Ideally, measurements should not be taken at edges of the model where overlap is reduced. For example, see FIG. 2.

The scene itself should also be noted. A homogeneous scene (for example a 10-acre field of barley) will have very little distinguishing features for the an image processing software to lock onto or pull out, whereas a busier scene with rocks, buildings, etc., has items that are clearly visible from the air that may be stitched together by the image processing software.

Some UVs are equipped with a global positioning system (GPS) module. When a photograph is taken, it may be "geotagged" so that metadata is embedded in the image properties with the GPS location of the UV at the time the image was taken. Image processing software may also use this information to get an idea of the layout of the images, and which images are beside each other and the height at which the images were captured (e.g., This step is typically visible in the first stages of the image processing project).

Ground control points (GCPs) are points in the scene of interest than are scanned in using specialized equipment to get their exact location in space. This allows the model generated to be "locked down" in real world space. If using GCPs (a normal project should have about five to eight), the image processing software can also use these GCPs to ensure the model is as accurate as possible. This is because the software will have knowledge of the exact distance between the GCPs, as well as their exact location in the real world. In fact, if the mission to be completed requires a very high level of accuracy, most mapping experts would agree that ground control points should be used.

However, GCPs are time consuming and require expensive equipment (such as a specialized survey equipment) to scan in the GCPs. The systems and methods described herein do not require the use of GCPs. In some embodiments, the systems and methods described herein improve accuracy of 2D models without the use of GCP which, as previously mentioned, may not be available to customers in the field (e.g., at an accident reconstruction).

There is a difference between relative accuracy and absolute accuracy. Say, for instance, that the distance in a model between the end of a wall and a shed is measured as 2 meters; very close to the distance they are apart in the real world. Then, the model may be seen as having good "relative accuracy". However, both points could be 1 meter off their actual location in the real world. This would mean the model would have poor "absolute accuracy". Sometimes, there is a trade-off: Is it better to fit the model to where the points are accurate in the real world "absolute accuracy", or is more important that the relative distance measurements within the model are accurate to each other "relative accuracy"? In some embodiments, the teachings herein focus on achieving an optimal accuracy from a mapping mission.

As noted, some UVs are equipped with a GPS module which "geotags" each image with the location of where the image was taken. However, some modules may not be accurate enough for centimeter level "absolute" accuracy. Most small commercial hand-held units are subject to small errors which result in a slight wandering or position drift from the real world. A model with good "relative accuracy" will be sufficient for most applications. Such a model will allow the user to measure distances in a reconstruction or get an independent well-constructed model of an area as an excellent visual tool. If high "absolute accuracy" is desired (i.e., for a ground survey), GCPs are added as above.

In some embodiments, four oblique images, taken at the corner looking back at the area of interest (where the area of interest is in the one shot), may be added to a 2D mapping process. The addition of the oblique images forces scale on the project, and results in better accuracy when taking measurements in the model. Recent testing has shown that the addition of just 4 oblique images (one at each corner or outer-most points of the grid pointing towards the center) provides an improvement in 2D mapping accuracy. In some embodiments, the addition of one or more oblique images improves the accuracy of the 2D map.

It should be noted that there is some mention of the use of oblique images the literature of 3D mapping. This is to be expected as to complete an accurate 3D mapping, height is important, as is detail on the side of buildings. In a 3D mapping, the entire grid of images (where the drone goes up and down pre-determined lanes taking images are prescribed intervals) may be taken with the camera titled up slightly (the entire dataset of images is 'oblique'). Alternatively a nadir dataset may be collected first, followed by subsequent flights/a circular mission looking in with the camera tilted looking at the side of a structure at various heights. I.e., a nadir dataset at 50 m, a circular mission taking images at an angle around a structure looking in at the structure once at 50 m, again at 30 m, and again at 10 m. By contrast, prior to the present disclosure, 2D mapping used only nadir images when constructing a 2D model.

Is should also be noted that oblique images in 3D mapping are used to capture texture and positional information for the portions of objects being modeled which would normally not be visible from a top-down (nadir) view. These include the "faces" or "sides" of objects as well as areas hidden under overhangs, or other pixel information that is missing from the top-down (i.e., nadir) view, etc. 3D mapping is not concerned about oblique images being on the same plane, but rather the collection of texture data and point-of-reference data. Moreover, the angle of the oblique image in a 3D mapping is not measured since the purpose of the oblique image in 3D mapping is to obtain a perspective view that provides detail that is not viewable from the nadir perspective.

It should also be noted that a nadir image typically captures a portion of an area of interest. By contrast, in 2D mapping, several nadir images may be taken and "stitched" together using orthomosaic processing (a subset of image processing). In some embodiments, the GPS position, height and angle of the camera are factors in obtaining an oblique image for 2D mapping. Oblique images in 2D mapping should preferably be taken from the same plane to optimize ground sampling distance and/or camera resolution (i.e., same resolution) in order to tie different parts of an image together to correct their respective position. Ideally, the angle of the camera in a 2D oblique image is set (e.g., calculated) to within a range based upon the distance between the camera and the ground centre of an area of interest. Ideally, for each oblique image, the camera will be positioned at a corner of the area of interest having an angle such that the camera's field of view is focused on the center of the area of interest. In such a setup, an oblique image may capture all or almost all of the area of interest. In some embodiments, the systems and methods described herein may determine an optimal camera angle and focus target for oblique images (during the data gathering stage), including determining the location of the corners of an area of interest and the location of an optimal focus target for the image (such as the center of the area of interest).

In the present 2D mapping disclosure, the oblique images may be used to constrain scale distortions in the 2D model. I.e., the texture and primary positional data has already been captured via the nadir images; the additional data points (e.g., oblique images) are used to reduce model error (not fill in gaps in the data). As taught herein, data from oblique images in 2D mapping may be used to correct for scale (e.g., correct relative pixel positions), and/or to correct for bowing or distortion in a map of non-flat surfaces or terrain obtained using only nadir images. Adding oblique images to 2D mapping also allows for corrections of distortions caused by errors from the aircraft or from the software. Oblique images also help correct (subtle) errors in the shape of a map.

In this disclosure, the term "nadir image" is intended to include images that are taken when a camera is oriented to take the image towards or approximately towards the center of the earth. Moreover, images that are taken when the camera's point of view is perpendicular, or approximately perpendicular to the ground. The term "oblique image" is intended to include images that are taken when a camera is oriented at an angle such that the camera is pointing towards a point on the earth that is not perpendicularly below (or approximately perpendicularly below) the camera. Moreover, images that are taken when the camera's point of view is not perpendicular (or approximately perpendicular) to the ground (i.e., at an angle towards the ground that is not perpendicularly below or approximately perpendicularly below the camera).

Figure 3:
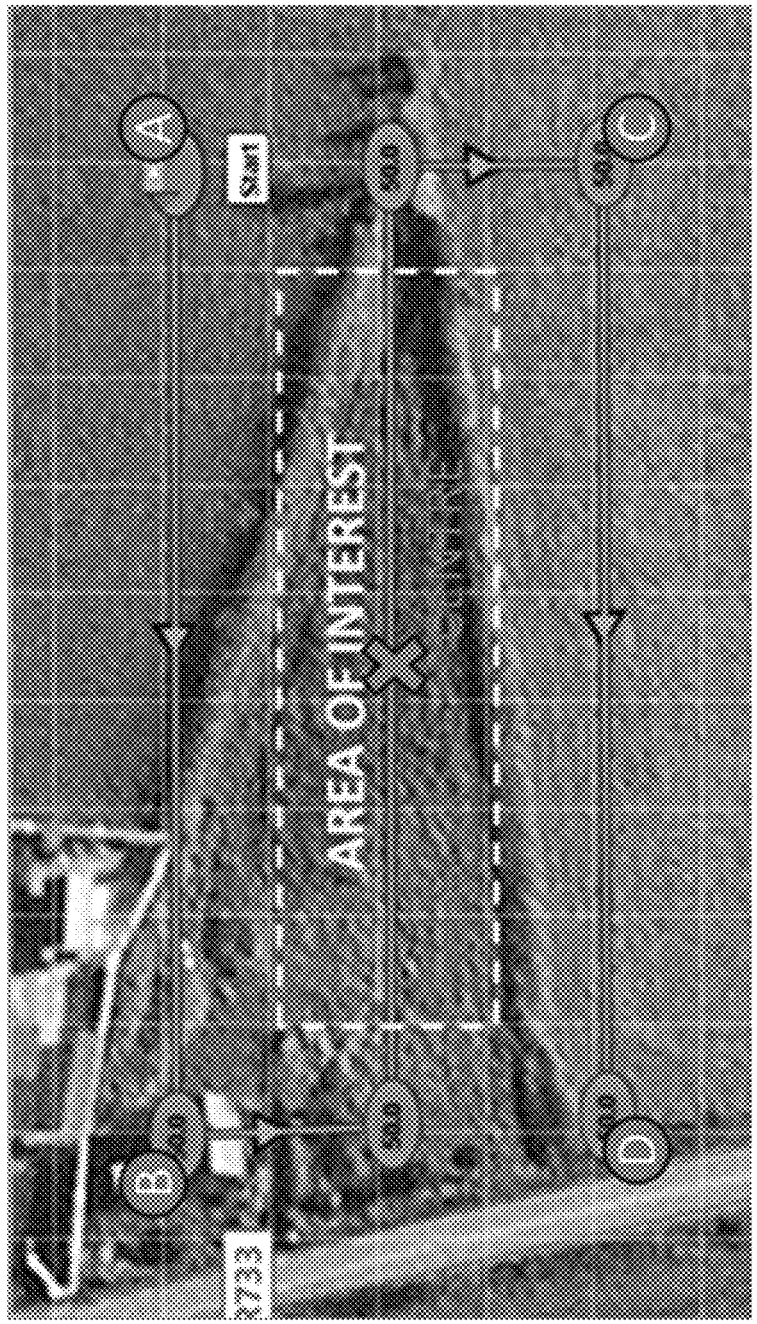
FIG. 3 illustrates an example of an aerial view, in accordance with some embodiments.

FIG. 3 illustrates an example of an aerial view 300, in accordance with some embodiments. The aerial view 300 includes a grid 310, an area of interest 320 having a centre 325, and a flight path 330 having positions (A), (B), (C) and (D). In some embodiments, software may allow a UV to automatically pitch the camera and take a picture with the target at the "center" 325 of the grid 310 at each corner (A), (B), (C) and (D) of a perimeter of an area of interest 320. It should be noted that a "corner" may be an actual corner of the perimeter or in close proximity to the actual corner an aerial distance above the ground and outside the actual perimeter. A UV may navigate the flight plan 330 while taking oblique images at the start position (A), points (B) and (C) at other corners or outer-most points of the grid 310, and at the end position (D). Ideally the aircraft would yaw quickly, pitch the camera to the right angle to look at the center 325 of the grid 310, execute the snapshot and then yaw back to start/continue the grid as normal. In this example, the flight plan allows for the camera to be 50 metres (m) above the ground. It should be noted that other heights may be used and may vary depending the size of the area of interest.

A 2D mapping software (e.g., FLIR's MCS Autogrid) may be modified to add new functions to automate the above plan. The new functions may perform the following bodies of work:

Identifying the center of a grid 310 that is created (the grid 310 may be generated as per normal mapping software functionality, based on the area of coverage the pilot has drawn). The functionality may also include a method for determining where the 'corners' or outermost points of the grid are to take photos if the grid is not a square or rectangle.

Automatic placing of a camera target at this 'center' 335 (height to be determined, likely ground level) but this target only becomes active at each of the corners (where the aircraft will pause, the camera target at the center would become active, causing the camera to pitch up and the aircraft to yaw to take an image looking at this camera target, then returning to nadir pitch and resuming the 2D mapping).

Figure 4:
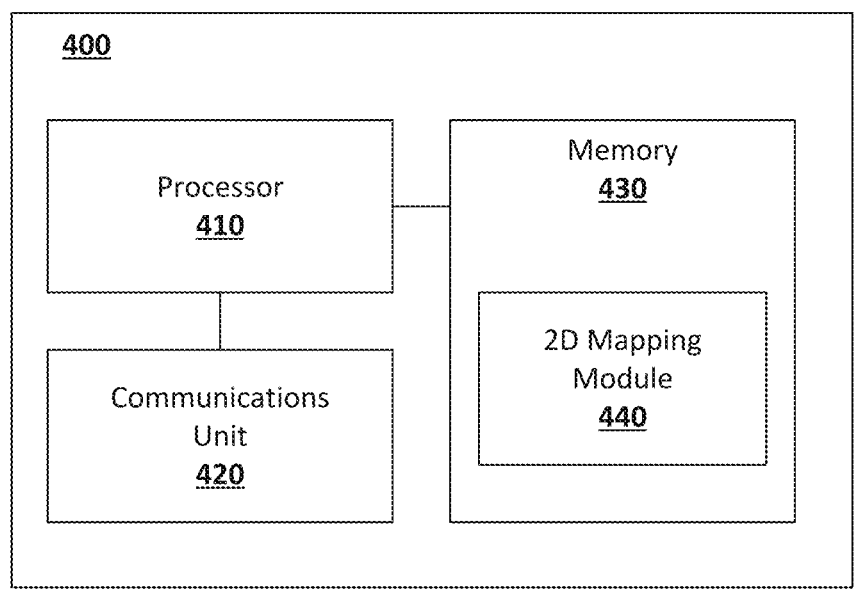
FIG. 4 illustrates, in component diagram, an example of a 2D mapping system, in accordance with some embodiments.

FIG. 4 illustrates, in component diagram, an example of a 2D mapping system 400, in accordance with some embodiments. The 2D mapping system 400 comprises at least one processor 410 for processing operating instructions, a communications unit 420 for receiving images and/or video feed from a camera, a memory 430 that stores operating instructions for the 2D mapping system 400, and a 2D mapping module 440 for storing instructions performed for the generation of 2D maps. Other components may be added to the 2D mapping system 400, including one or more cameras and one or more UVs. The at least one processor 410 may execute the instructions stored in the 2D mapping module 440, and thus, becomes configured to perform many of the methods described herein. In some embodiments, the 2D mapping system 400 may be implemented at a ground station, a user device, a UV, a payload for a UV, or a server connected to ground station, user device or UV, etc.

Figure 5:
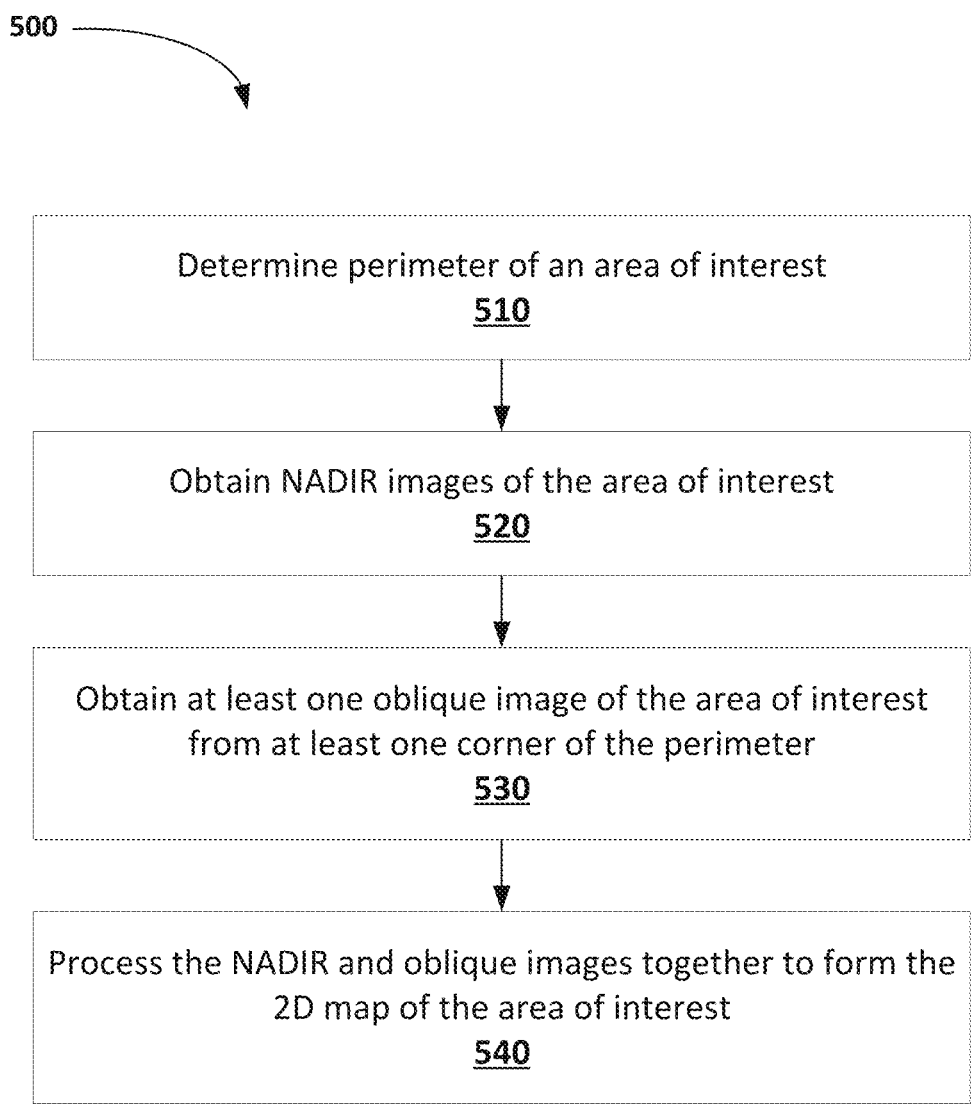
FIG. 5 illustrates, in a flowchart, an example of a method of generating a 2D map, in accordance with some embodiments.

FIG. 5 illustrates, in a flowchart, an example of a method of generating a 2D map 500, in accordance with some embodiments. The method 500 comprises determining a perimeter of an area of interest 510, obtaining nadir images of the area of interest 520, obtaining at least one oblique image of the area of interest from at least one corner of the perimeter 530, and processing the nadir and oblique images together to form the 2D map of the area of interest 540. Other steps may be added to the method 500, such as instructing or controlling a camera on a UV to take the nadir and oblique images, and instructing or controlling the UV to take an autogrid flight plan. In some embodiments, the nadir and oblique images are received from the camera on the UV.

The term "autogrid" is used herein to describe a grid flight path with determined overlap and camera settings (e.g., nadir) taken by a UV over an area of interest. The term "Autogrid" is used herein to describe a software tool that creates, deploys and/or causes a UV to executed a grid flight path and capture images at a determined height and with desired image overlap.

Figure 6:
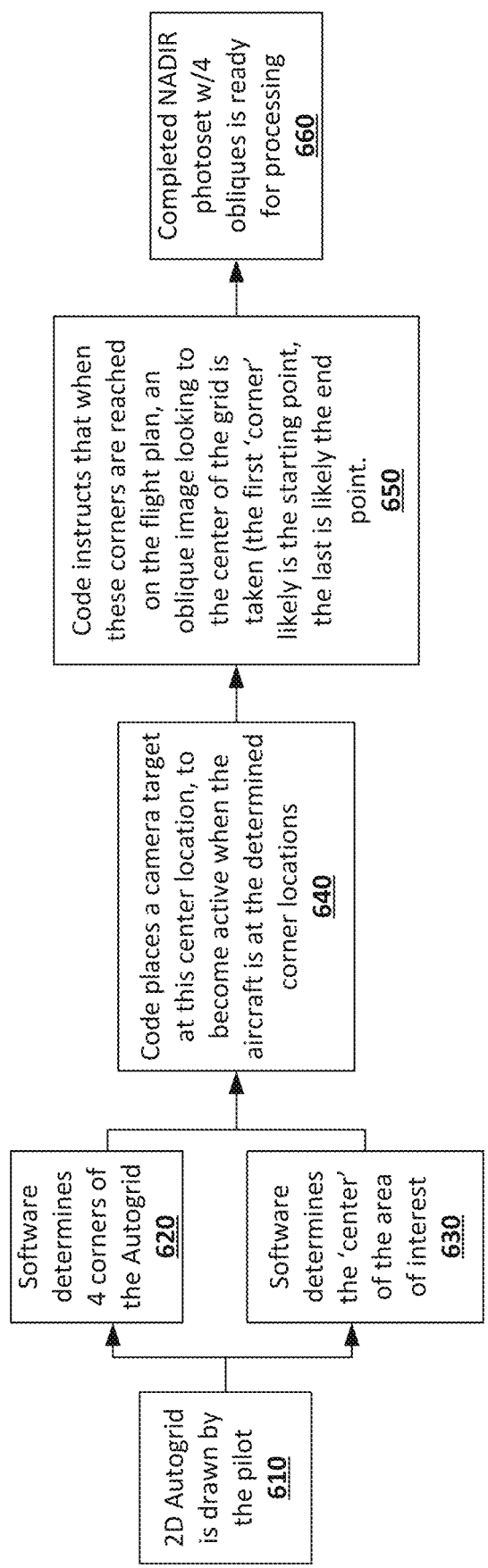
FIG. 6 illustrates, in a flowchart, another example of a method of generating a 2D map, in accordance with some embodiments.

FIG. 6 illustrates, in a flowchart, another example of a method of generating a 2D map 600, in accordance with some embodiments. The method 600 comprises drawing a 2D autogrid 610, determining the four corners of the autogrid 620, determining the centre of the area of interest 630, placing a target at the centre of the area of interest 640 (to become activated when the UV is at the determined corner locations), take oblique image when UV reaches the determined corner locations 650 (e.g., the first corner is likely the starting point of a flight path, the last corner is likely the end point), and process the complete nadir photoset with four oblique images 660. Other steps may be added to the method 600, such as instructing or controlling a camera on a UV to take the nadir and oblique images, and instructing or controlling the UV to take an autogrid flight plan. In some embodiments, the nadir and oblique images are received from the camera on the UV.

A covering of a grid of terrain (e.g., using FLIR's Autogrid software) may be completed by an aircraft (e.g., UV) taking a series of downward facing images whereby the camera is pointed straight down (known as nadir imagery). An image processing software (e.g., PIX4D) may then "stitch" together the nadir images to create the 2D model. However, without the GCPs to reference where the model is in the real world, or how far an object is from other objects, some variability and inaccuracy can creep into the model. Adding oblique images to the dataset reduces the inaccuracy. An oblique is an image taken at an angle as described above. By adding oblique imagery, the model can resolve degeneracies in perspective and scale resulting in superior accuracy of measurements and reduced variability flight to flight.

Figure 7A:
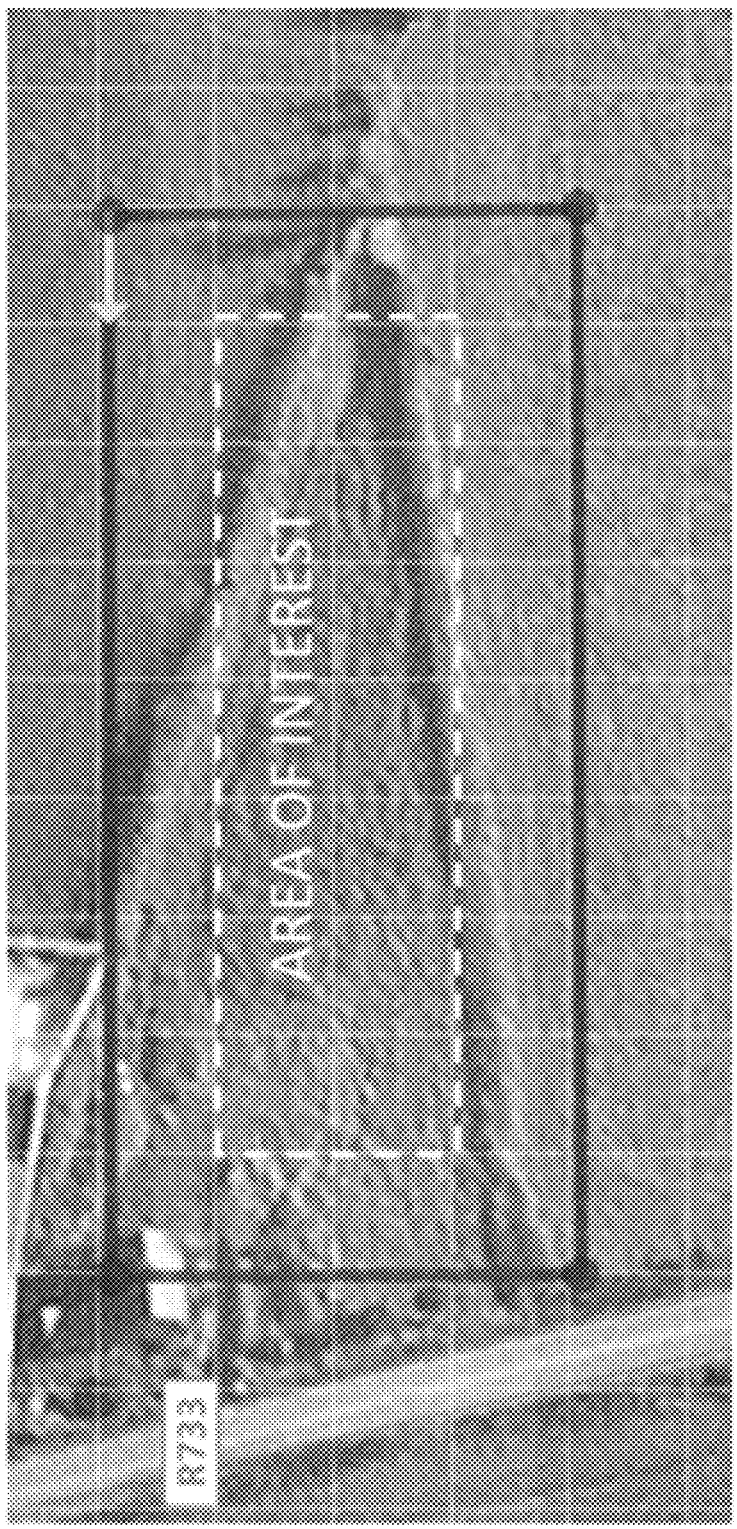
FIGS. 7A and 7B illustrate an example of flight setup and data collection, in accordance with some embodiments.
Figure 7B:
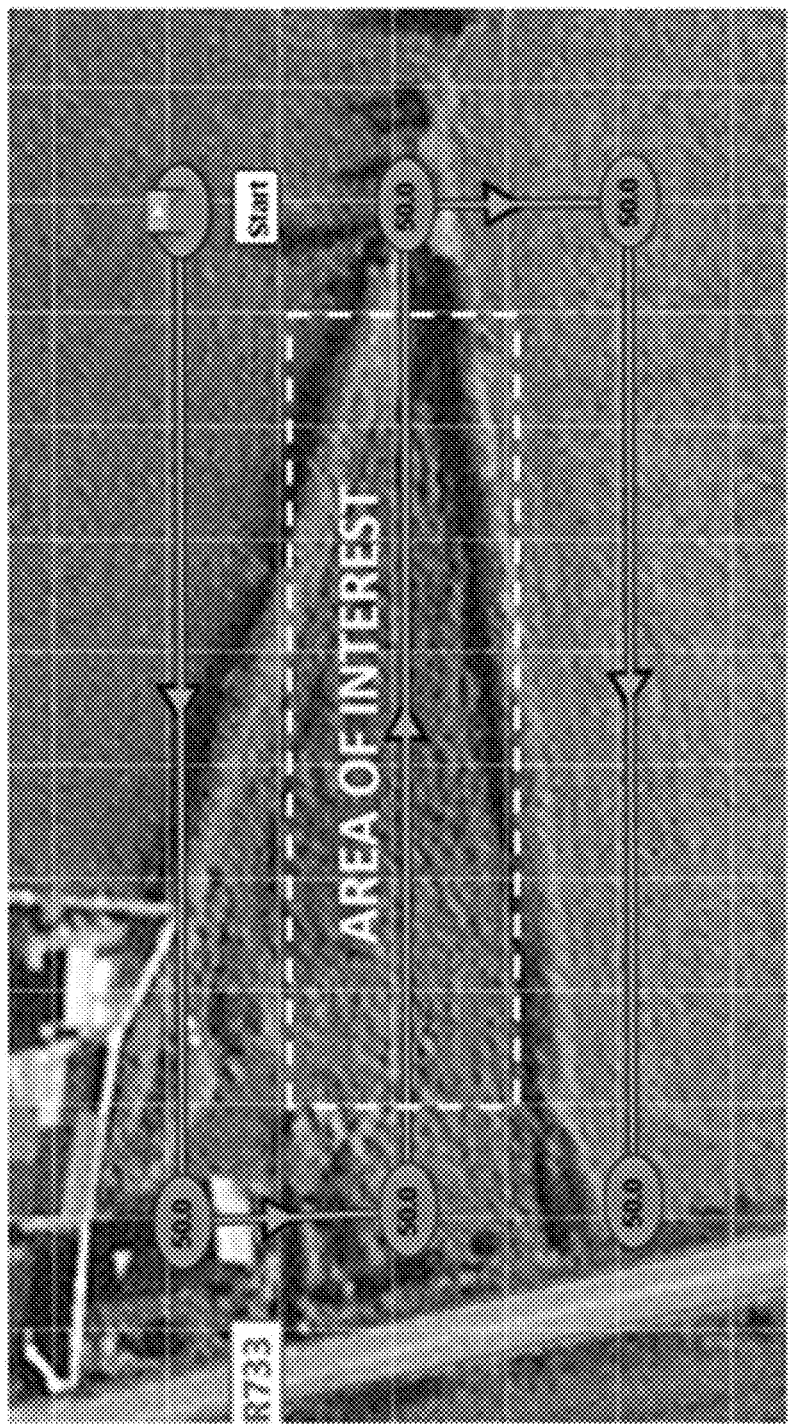

FIGS. 7A and 7B illustrate an example of flight setup and data collection, in accordance with some embodiments. First, a grid on a UAV Control Software (e.g., FLIR's MCS AutoGrid) is set up to enable flight planning. Next, a default autogrid may be initiated on the map. The corners of the grid may be dragged until the area of interest is well within the grid area. It should be noted that a good overlap should be maintained on all sides. In the example shown in FIGS. 7A and 7B, the grid lines are used to create a symmetrical autogrid.

Figure 8:
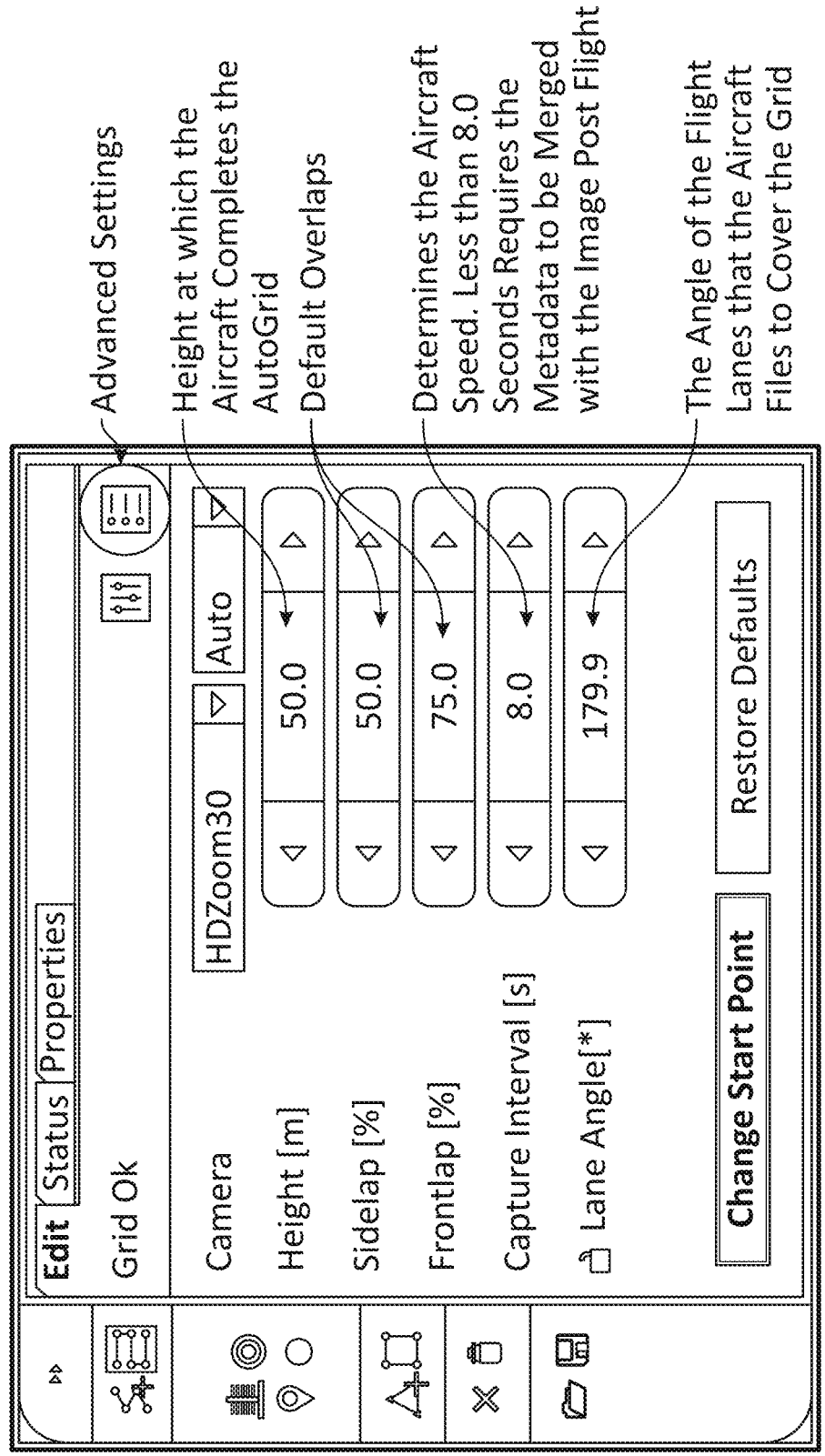
FIG. 8 illustrates an example of an Edit tab, in accordance with some embodiments.

Autogrid settings may be reviewed. FIG. 8 illustrates an example of an Edit tab 800, in accordance with some embodiments. On the Edit tab, one or more of the following actions may be performed. In the Camera field, it may be verified that the correct camera appears. In the Height field, arrows may be used to set the height at which the aircraft should fly. The height selected affects the ground sample resolution of the pictures taken. The field of view of the camera may also affect the resolution. For example, the higher the UV, the more it will see in one shot, so less lanes are required in the autogrid for a given area and it will complete quicker. It will also see more in one image from a higher perspective, so any easy to spot "locking features" will be easier for an image processing method or software to stitch together. However, at higher altitudes, resolution will be lost. Typically, "resolution" on the status tab will change with changes in height. The lower the aircraft, the greater the "resolution" or "ground sampling distance". The camera will see less area in its field of view so more lanes in the autogrid are required and hence more time will be required to cover the area. On a homogenous scene (such as, for example, a barley field), with each image having less of the area in it, an image processing software may find it harder to find "locking features" to complete the stitch. In some embodiments, the height may be set to 50 metres (m).

To set the percentage of overlap between each row of pictures, the Side-lap field may be set. To set the percentage of overlap between one picture and the next, set the Front-lap field may be set. In some embodiments, the set percentage of overlap may be default settings of 75% (front) 50% (side) overlap.

To set the length of time between pictures, the Capture Interval field may be set. Capture interval will determine the speed of the aircraft. For example, on FLIR's SkyRanger R60, a capture time lower than 8.0 seconds may lead to the metadata to be merged with the image post flight which is easy to do. FLIR's SkyRanger R70 can merge metadata at any capture speed, and also can go as low as 2 second capture time should a quicker time to completion be desired. In some embodiments, the pilot can verify the estimated time the autogrid will take before flight by checking the "capture time" on the status tab.

Figure 9:
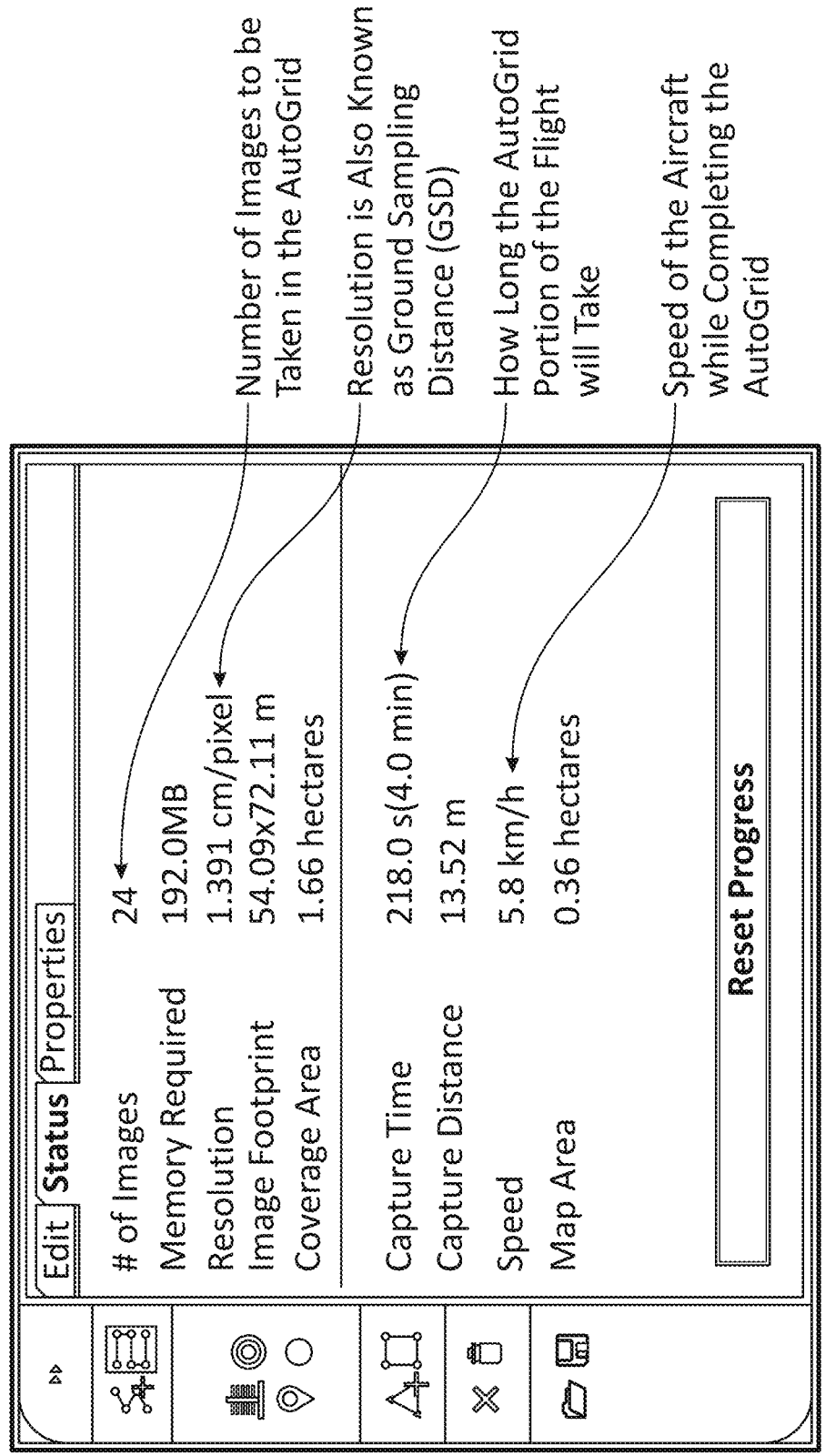
FIG. 9 illustrates an example of a Status tab, in accordance with some embodiments.

FIG. 9 illustrates an example of a Status tab 900, in accordance with some embodiments. The "# of Images" is good to note as a similar count should be seen when the images are imported to the image processing (including the additional oblique images taken later).

The Resolution field shown in the Status Tab 900 shows the resolution, in cm/pixel, for the pictures. This resolution determines the amount of detail available in the pictures. It is affected by the height that the aircraft flies during the autogrid flight. In some embodiments, the maximum resolution is 0.1 cm/pixel.

Resolution also known as Ground Sampling Distance (GSD), is often referenced in mapping literature, and especially when using Ground Control Points (GCPs). For example, the GSD may be referenced in a quality report of an image processing software. There are many factors which affect GSD, such as the height at which the autogrid is flown, but there are also internal parameters of the camera such as resolution and focal length that can affect this GSD figure.

GSD may be quoted in 'centimeters per pixel'. In the settings shown in FIG. 9, for every 1 pixel in the image taken, that will be 1.391 cm long in the real world. GSD becomes valuable when using GCPs. For example, there would be no point using expensive ground sampling equipment to get sub-centimeter level accuracy on a GCPs, then flying at a height where each pixel in the image is larger (e.g., ten times larger).

Once the flight has been set up, an auto-grid mission may be completed as planned. It should be noted that if using FLIR's HDZoom camera, the camera should not be in Zoom at any point in a mapping mission, as doing so will change the focal length and result in undefined results. The zoom should not be touched at any point in a mapping mission.

The final step in the data collection process is to add an image taken at each corner of the grid, looking into the center of the grid. These photographs are taken at an "oblique" angle and, as mentioned, better lock perspective and scale on the image processing model which results in better relative accuracy whilst reducing variability. In some embodiments, these images are taken while a vehicle is navigated (e.g., flown) manually. In some embodiments, a UV may be set with a flight plan and flown autonomously. Such images may be taken at any time in the data collection process as long as they are included in the data set.

Figure 10:
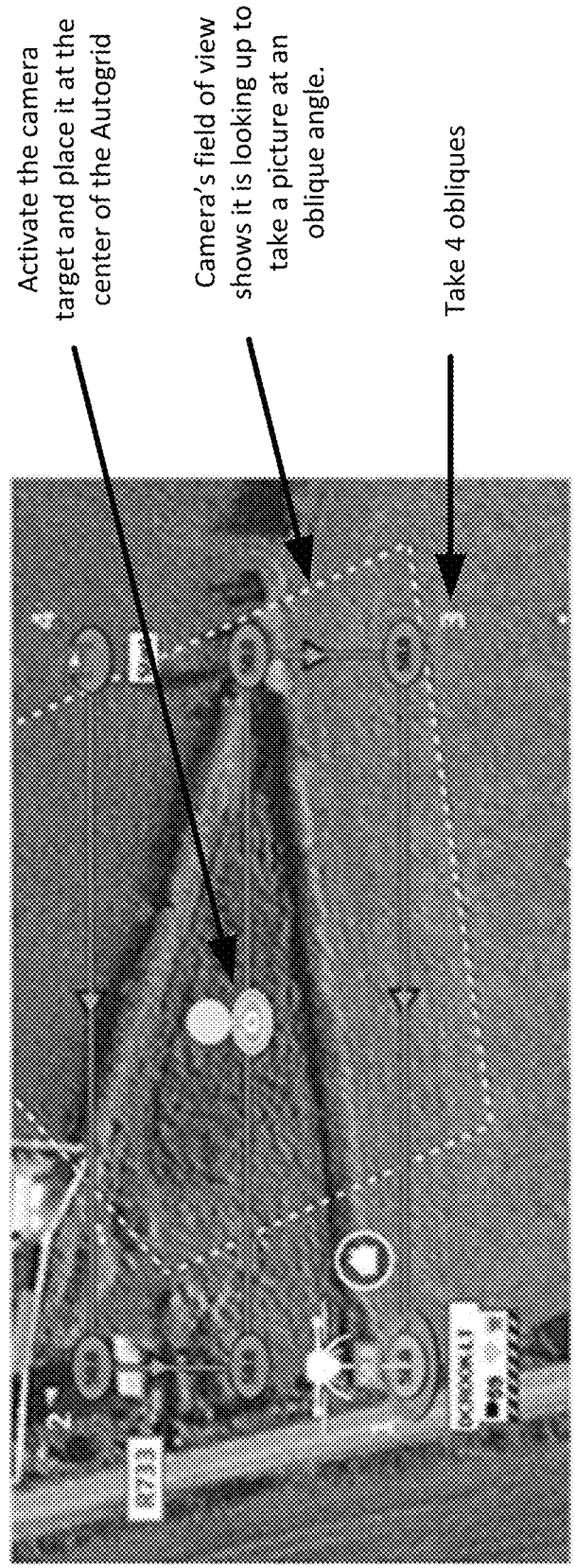
FIG. 10 illustrates examples of taking oblique images, in accordance with some embodiments.

FIG. 10 illustrates examples of taking oblique images, in accordance with some embodiments. Upon completion of the grid plan (e.g., using FLIR's Autogrid functionality), the aircraft will be at one of the corners of the grid. The camera target should be activated and set to the middle of the grid. The camera should be given enough time to orient itself at the oblique angle. Once at the correct angle, the picture may be taken. The camera target may also be activated whenever the aircraft arrives at the determined corners where the oblique images are to be taken (e.g., while the autogrid is in process). The camera should be given enough time to orient itself at the oblique angle. Once at the correct angle, the picture may be taken. Once the picture is taken, the camera may return to a nadir mode of operation, and the aircraft may resume with the autogrid plan.

The UV may then be brought back to the other two grid corners (numbers "2" and "3" in FIG. 10). This may be performed by activating the waypoint at that corner to "bring the aircraft here". Since the "Start" position involves more manual flight, it may be left until last. Once the aircraft (e.g., UV) is in position, a picture may be taken.

To complete the 4th and final image taken from the Start location, the aircraft may be manually (i.e., via controller) brought close to the start point using a "bring the aircraft here" icon. Then, the location may be fine-tuned to get close the 4th corner. The aircraft position does not have to be exactly at the start corner location.

Figure 11A:
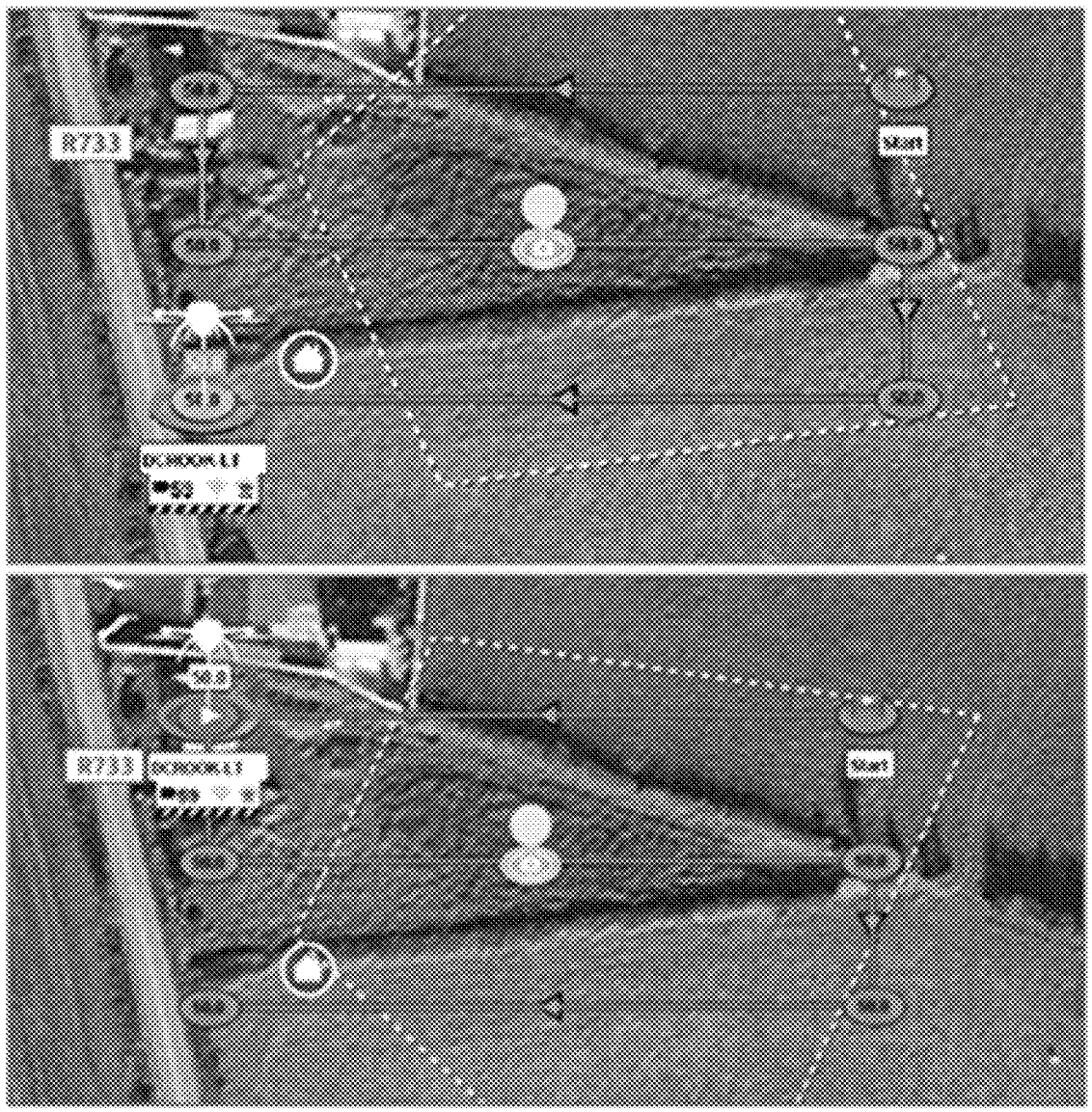
FIGS. 11A and 11B illustrate four oblique images taken at each corner, in accordance with some embodiments.
Figure 11B:
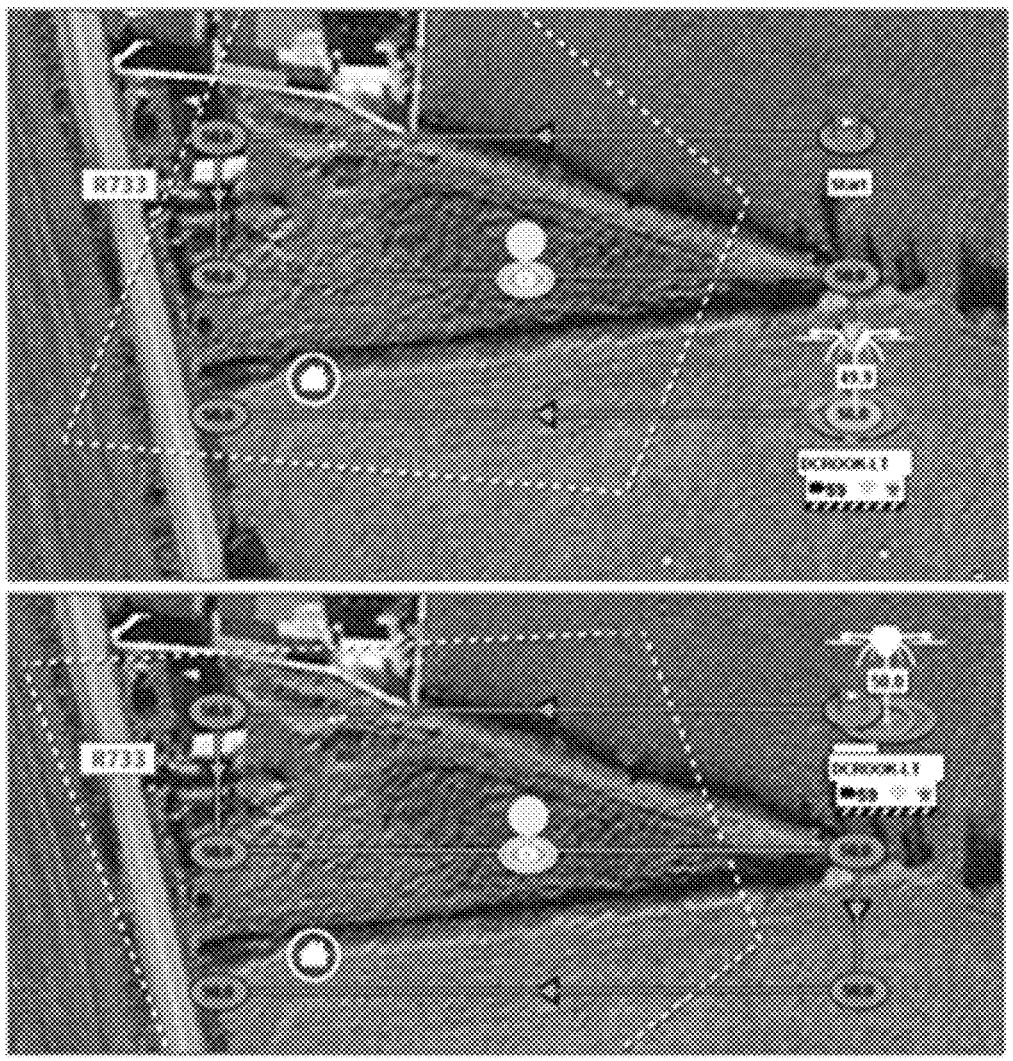

FIGS. 11A and 11B illustrate four oblique images taken at each corner, in accordance with some embodiments. Once the 4 oblique images are taken, the UV may return home and land. The SD card storing the images may be retrieved from the aircraft.

In some embodiments, the model and results may be generate using an image processing software. Measurements in the model may also be made using an image processing software.

In some embodiments, when creating models without the use of GCPs, adding oblique imagery results in over a ten times (10x) improvement in relative accuracy when taking measurements in the model. There is an inherent variability flight to flight of measurement accuracy when GCPs are not used. Adding oblique imagery to the model results in a 70% decrease in variability flight to flight. Thus, relative accuracy is improved without the use of GCPs.

It should be noted that a nadir image typically captures a portion of an area of interest. In 2D mapping, several nadir images may be taken and "stitched" together using orthomosaic processing (a subset of image processing). In some embodiments, the GPS position, height and angle of the camera are factors in obtaining an oblique image for 2D mapping. Ideally, the camera will be on the same plane as the nadir images of the area of interest, and the camera will be positioned at a corner of the area of interest having an angle such that the camera's field of view is focused on the center of the area of interest. In such a set up, an oblique image may capture all or almost all of the area of interest.

As noted above, adding oblique images to 2D mapping allows for corrections of distortions caused by errors from the aircraft or from the software. When terrain is not flat, oblique images help correct distortions as well. Oblique images also help correct (subtle) errors in the shape of a map. In some embodiments, the systems and methods described herein may determine an optimal camera target for oblique images (during the data gathering stage), including determining the location of the corners of an area of interest and the location of an optimal focus target for the image (such as the center of the area of interest).

Figure 12:
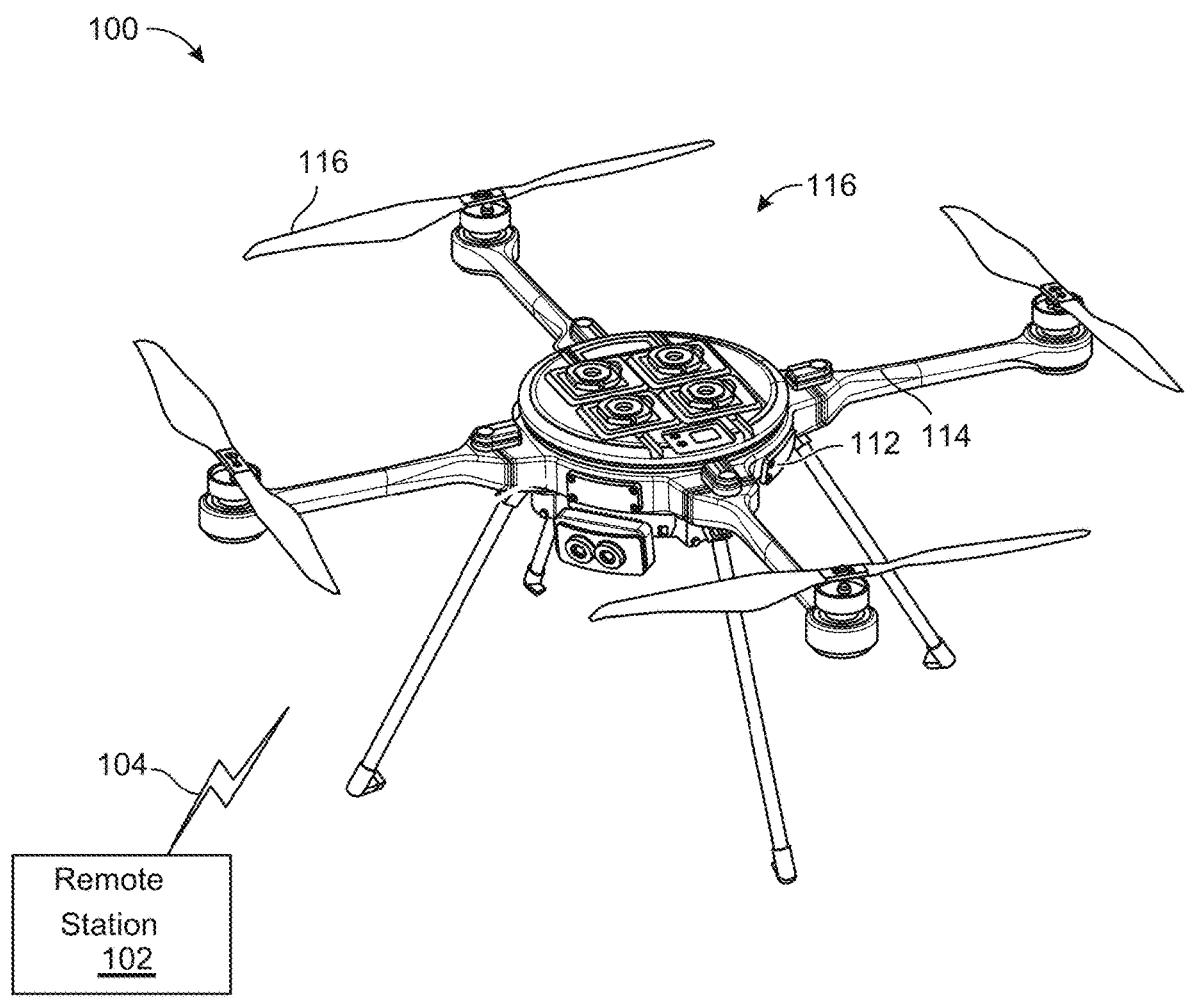
FIG. 12 illustrates an example of an unmanned system (US) comprising an unmanned vehicle (UV) and its associated system elements, in accordance with some embodiments.

FIG. 12 illustrates an example of an unmanned system (US) 100 (such as an unmanned aircraft system) comprising an unmanned vehicle (UV) 110 (such as an unmanned aerial vehicle) and its associated system elements, in accordance with some embodiments. The UV 110 may be designed to operate with no operator (or pilot) onboard. In the embodiment shown in FIG. 12, the unmanned system 100 includes a remote operator (or pilot) station 102 and command and control links 104 between the UV 110 and the remote operator (or pilot) station 102. The command and control links 104 may include any data link for the purposes of managing the movement (e.g., flight) of the UV 110. The UV 110 may operate autonomously without operator (or pilot) intervention in the management of the movement (e.g., flight) during the entire movement (e.g., flight) operation or a portion thereof. The unmanned system 100 may also include other system elements as may be required at any point during movement (e.g., flight) operation.

In some embodiments, UV 110 may be an unmanned aircraft (UA) or UAV as shown in FIG. 12.

The example UV 110 shown in FIG. 12 may include a body 112, arms 114 extending away from the body 112 to support components such as propellers 116, and legs 118 to support the body 112 when UV 110 is positioned on a surface. When not in use, a propeller may be in a folded position. It is understood that propellers 116 may be in the folded position during storage of the UV 110, while the open position is used during flight operation of the UV 110. Although four arms 114 and four legs 118 are illustrated in the embodiment shown in FIG. 1, it is understood that UV 110 may include any other number of arms 114 and legs 118. As noted above, the example of FIG. 12 pertains to a UAV by way of example only. Other types of UVs may also employ the teachings described herein.

In some embodiments, remote pilot (or operator) station 102 may comprise a ground station. In other embodiments, remote pilot (or operator) station 102 may comprise a client device acting as a control station. In still other embodiments, remote pilot (or operator) station 102 may comprise both a ground station and a client device.

Figure 13:
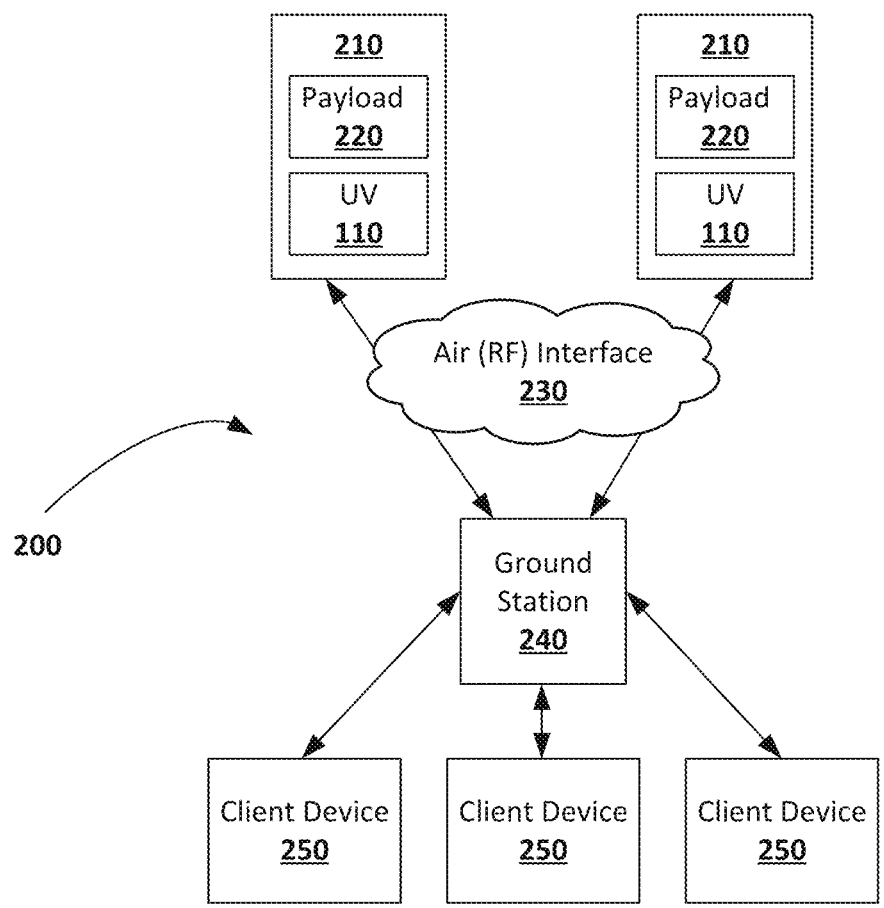
FIG. 13 illustrates, in a component diagram, an example of a US, in accordance with some embodiments.

FIG. 13 illustrates, in a component diagram, an example of a US 200, in accordance with some embodiments. The US 200 may include one or more loaded vehicles 210, a ground station 240, and one or more client devices 250. The US 200 may include more than one ground station 240. A loaded vehicle 210 may include a UV 110 and a payload 220. The ground station 240 may communicate with one or more loaded vehicles 210 via air interface 230 which may include satellite communication or other types of radio frequency communication between station 240 and loaded vehicles 210. The ground station 240 may communicate with one or more client devices 250 through a number of communication links and network interfaces, such as a wired or wireless local area network, a cellular network (such as global system for mobile (GSM) communication, long-term evolution (LTE), fifth generation (5G), or other cellular networks) or a proprietary or private radio link.

A loaded vehicle 210 may include a UV 110 and a payload 220. The payload 220 may include one or more of: a freight package, a camera, a measuring device, one or more sensors, and a storage device (e.g., a universal serial bus (USB) drive). A payload 220 can also include, for example, flame retardant for use in a forest fire. Generally speaking, a payload 220 may be any cargo or equipment a UV 110 carries that is not necessarily required for flight, control, movement, transportation and/or navigation of the UV 110 itself. A payload 220 may be attached or coupled to the UV 110 in a number of ways. For example, a payload 220 may be connected to the UV 110 by one or more interfaces such as an Ethernet connection, a controller area network (CAN) bus connection, a serial connection, an inter-integrated circuit ($I^2C$) connection, a printed circuit board (PCB) interface, a USB connection, a proprietary physical link, and so on.

The ground station 240 may be configured to communicate with one or more loaded vehicles 210 (or simply "vehicles 210" hereinafter). The ground station 240 may also communicate with UVs 110 not carrying any payload. The ground station 240 may control one or more loaded vehicles 210, one or more UVs 110, one or more payloads 220 concurrently in real-time or near real-time. The ground station 240 may also receive commands and/or data from one or more client devices 250, process the commands or data, and transmit the processed commands or data to one or more vehicles 210, UVs 110, or payloads 220. In some embodiments, the ground station 240 may receive user input directly at a user console (not shown) without client devices 250. In some embodiments, a client device 250 may be the user console for the ground station 240.

A client device 250 may serve to control the operation of one or more vehicles 210, UVs 110, or payloads 220 remotely. In some embodiments, a client device 250 may also be referred to as a control station. The client device 250 may be implemented as a computing device.

A user, such as an owner or operator of a UV 110, may use a client device 250 to communicate with, and to control, one or more vehicles 210, UAVs 110, or payloads 220. A client device 250 may have an application implemented for communicating with or controlling vehicles 210, UVs 110, or payloads 220. Such an application may be launched as a stand-alone process in an operation system, or within an Internet browser. The user may enter information through a user interface provided by the application. In addition, information relating to, or from, the vehicle 210, UV 110, or payload 220 may be displayed by the application on a display of client device 250. Client device 250 may communicate with, or control, vehicle 210, UV 110, or payload 220 through the ground station 240, or in some embodiments, client device 250 may communicate with, or control, vehicle 210, UV 110, or payload 220 directly without the ground station 240.

In some embodiments, the client device 250 is operable to register and authenticate users (using a login, unique identifier, biometric information or password for example) prior to providing access to loaded vehicles, payloads, UVs, applications, a local network, network resources, other networks and network security devices. The client device 250 may serve one user or multiple users.

In some embodiments, communication hardware and communication links may include a network interface to enable computing device to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g., WMAX), SS7 signaling network, fixed line, local area network, wide area network, and others, including any combination of these.

Either or both of the ground station 240 and the client device 250 may be configured to control vehicle 210, UV 110, or payload 220. Flight control, navigation control, movement control, and other types of command signals may be transmitted to the UV 110 for controlling or navigating one or more of vehicle 210, UV 110, or payload 220. Command signals may include command data (e.g., coordinate information) required to execute flight control, movement control or navigation control of one or more of vehicle 210, UV 110, or payload 220.

Either or both of the ground station 240 and the client device 250 may be configured to receive data from one or more of vehicle 210, UV 110, or payload 220. For example, payload 220 may transmit audio, video or photographs to the ground station 240 or the client device 250.

Figure 14:
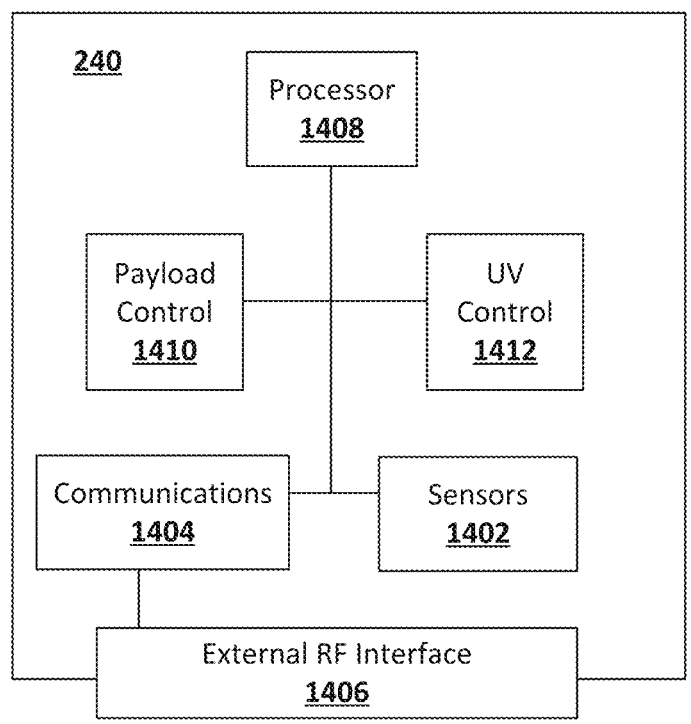
FIG. 14 illustrates, in a component diagram, an example of a ground station, in accordance with some embodiments.

FIG. 14 illustrates, in a component diagram, an example of a ground station 240, in accordance with some embodiments. The ground station 240 may include a sensor subsystem 1402 (which may include a global positioning system (GPS) subsystem), a communications module 1404 configured to process received data packets, and to prepare data packets for transmission through an external radio frequency (RF) interface 1406, an external RF interface configured to communicate with an external RF interface on a UV 110, a processor or controller 1408, a payload control module 1410, and a UV control module 1412. The sensor subsystem 1402 may be used to acquire environmental data if the ground station 240 is proximate or near the UV 110, where the environmental data may be used for controlling the UV 110, the payload 220, or the loaded vehicle 210, such as location data, weather data, and so on. The payload control module 1410 may generate command signals for controlling the payload 220, and the UV control module 1412 may general command signals for controlling the UV 110. Both types of control commands may be processed by the communications module 1404 and transmitted to the UV 110 and the payload 220 via external RF interface 1406. The ground station 240 may also include an operator console (not shown) that includes a display (not shown) providing video feed from a camera payload on the UV 110. The embodiments described herein refer to a video feed from a camera. It should be understood that the same teachings apply to an image or video feed from the camera.

Figure 15:
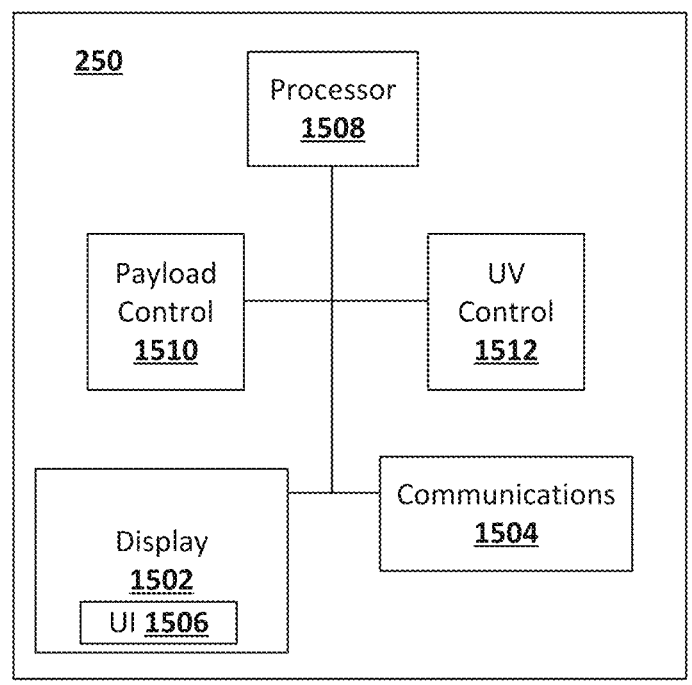
FIG. 15 illustrates, in a component diagram, an example of a client device, in accordance with some embodiments.

FIG. 15 illustrates, in a component diagram, an example of a client device 250, in accordance with some embodiments. The client device 250 may comprise a communications subsystem 1504, a processor or central computer system 1508 and a display 1502. The communications subsystem 1504 allows for seamless communications between the client device 250 and UV 110, seamless communications between the client device 250 and payload 220, and seamless communications between the client device 250 and each ground station 240, when ground stations 240 are used. The user interface (UI) 1506 is generated by processor 1508 for display on the display 1502 of a client device 250, which remotely controls the UV 110, the payload 220, and/or the loaded vehicle 210 or as part of a control system for one or more vehicles 210. Display 1502 may be a touch-screen display, or a non-touch display. In some embodiments, client device 250 may be on a single-unit computer (e.g., one with a built-in display), or a multi-unit computer (e.g., with a separate display). The payload control module 1510 may generate command signals for controlling the payload 220, and the UV control module 1512 may general command signals for controlling UV 110. Both types of control commands may be processed by communications module 1504 and transmitted to the UV 110 and the payload 220 via the ground station 240.

The client device 250 is configured to display at least a subset of the received vehicle status data for each UV 110 or payload 220 in an interface (such as UI 1506, for example). A display 1502 may provide a graphical representation of the respective vehicle location data of each of the vehicles 110. Through the interface 1506, the client device 250 may receive control command input. The control command input is associated with one of the UV 110 having its vehicle status data displayed in the interface 1506. The client device 250 may then transmit the received control command, or a command derived therefrom, to the UV 110. The interface 1506 may enable a user to view status and control operation of each of one or more UVs 110 such that the location of each UV 110 is shown in the interface 1506, and each UV 110 may be independently controlled through the interface 1506 by selecting a particular one of the UV 110 to control. In this way, multiple UV 110 may be monitored and controlled through an interface 1506 at the client device 250.

Further detail on the controlling UVs 110 using interface 1506 is provided in PCT Application No. PCT/CA2013/000442 entitled "System and Method for Controlling Unmanned Aerial Vehicles", the entire contents of which are hereby incorporated by reference. Client device or control station 250 may control interface panels to display a location of the UV 110.

Figure 16:
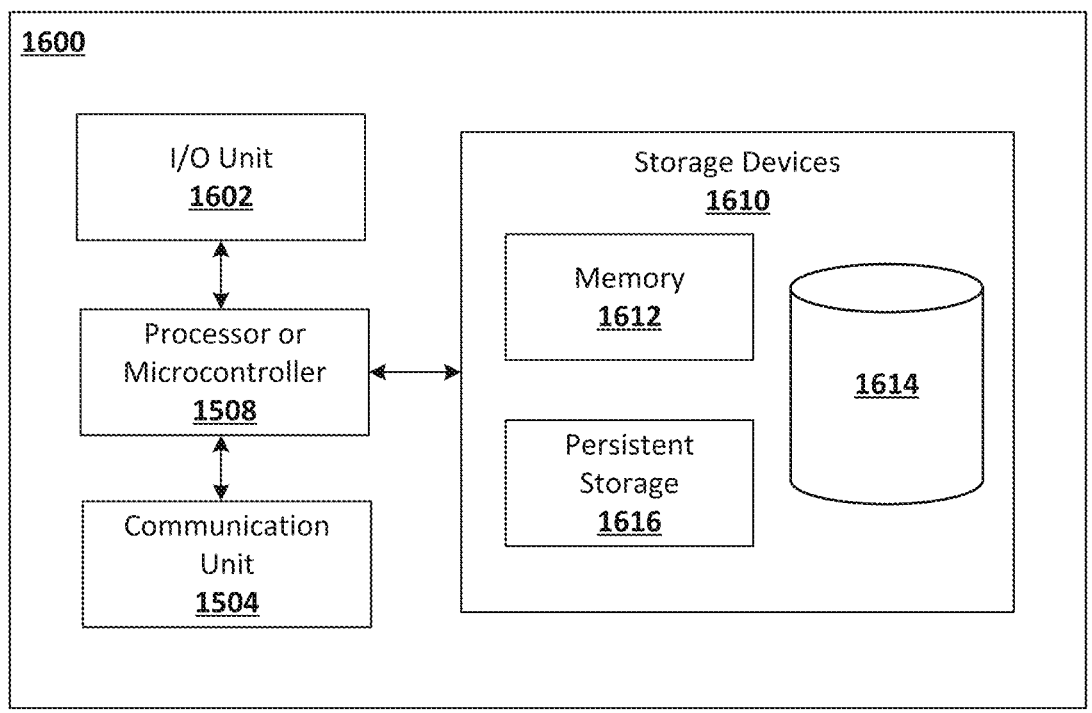
FIG. 16 illustrates, in a component diagram, an example of a control station, in accordance with some embodiments.

FIG. 16 illustrates, in a component diagram, an example of a control station 1600, in accordance with some embodiments. The control station 1600 may be a client device 250, and/or a ground station 240 having a display, and/or a remote pilot station 102. In some embodiments, the control station 1600 may be implemented on a tablet, phone, computer, purpose-built control station or other capable device or system. A processor or controller 1508 can execute instructions in memory 1612 to configure the communications module 1504, the payload control module 1510 and the UV control module 1512. A processor 1508 can be, for example, any type of general-purpose microprocessor or microcontroller, a digital signal processing (DSP) processor, an integrated circuit, a field programmable gate array (FPGA), a reconfigurable processor, or any combination thereof.

Memory 1612 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Storage devices 1610 include memory 1612, databases 1614, and persistent storage 1616.

Each I/O unit 1602 enables the control station 1600 to interconnect with one or more input devices, such as a keyboard, mouse, camera, touch screen and a microphone, or with one or more output devices, such as a display screen 1502 and a speaker. The discussion below will focus on a camera (payload) as an input device and a display 1502 as the output device. As will be further described below, UV 110 telemetry readings will also be used as input.

Each communication unit or interface 1504 enables the control station 1600 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g., WMAX), SS7 signaling network, fixed line, local area network, wide area network, and others, including any combination of these. For example, a communication interface 1606 may include an Ethernet connection to the ground station 240, or a wireless communication interface operable to communicate with ground station 240. In some embodiments, the communication interface 1504 may include a RF interface operable to communicate with the UV 110.

The embodiments of the devices, systems and processes described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references may be made regarding control and computing devices. It should be appreciated that the use of such terms may represent one or more computing devices having at least one processor configured to execute software instructions stored on a computer readable tangible, non-transitory medium. For example, a remote station 102, 240, 250, 1600 may have a server that includes one or more computers coupled to a web server, database server, or other type of computer server in a manner to fulfill described roles, responsibilities, or functions.

The foregoing discussion provides many example embodiments. Although each embodiment represents a single combination of inventive elements, other examples may include all possible combinations of the disclosed elements. Thus, if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product instructing physical operations, such as controlling movement of the UV 110, for example. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the processes provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and processes implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The processor or controller 308, 408, ground station 240, or client device 250, 500 may be implemented as a computing device with at least one processor, a data storage device (including volatile memory or non-volatile memory or other data storage elements or a combination thereof), and at least one communication interface. The computing device components may be connected in various ways including directly coupled, indirectly coupled via a network, and distributed over a wide geographic area and connected via a network (which may be referred to as "cloud computing").

For example, and without limitation, the computing device may be a server, network appliance, microelectromechanical systems (MEMS) or micro-size mechanical devices, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the processes described herein.

A processor may be, for example, a general-purpose microprocessor or microcontroller, a digital signal processing (DSP) processor, an integrated circuit, a field programmable gate array (FPGA), a reconfigurable processor, a programmable read-only memory (PROM), or any combination thereof.

Data storage device may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Computing device may include an I/O interface to enable computing device to interconnect with one or more input devices, such as a keyboard, mouse, camera, touch screen and a microphone, or with one or more output devices such as a display screen and a speaker.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, processes and steps described in the specification. As one of ordinary skill in the art will readily appreciate from the disclosure of the present invention, processes, machines, manufacture, compositions of matter, means, processes, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, processes, or steps.

As can be understood, the examples described above and illustrated are intended to be exemplary only. The scope is indicated by the appended claims.

The invention claimed is:

1. A system for generating a two-dimensional (2D) map of an area of interest, the system comprising:
   at least one processor; and
   a memory storing machine-readable instructions that when executed by the at least one processor, configure the at least one processor to:
   determine a perimeter of an area of interest;
   obtain nadir images of the area of interest;
   obtain at least one oblique image of the area of interest from at least one corner of the perimeter; and
   process the nadir and oblique images together to form the 2D map of the area of interest, the at least one oblique image being used to correct distortions in image data obtained from the nadir images, wherein:
at least two of the nadir images overlap; and
the at least one oblique image is used to correct distortions introduced by stitching of the overlapping nadir images.

2. The system as claimed in claim 1, comprising an unmanned vehicle (UV) having a camera, wherein the processor is configured to control the camera on the UV to obtain the nadir and oblique images;
wherein each of the nadir images captures a portion of the area of interest, and the at least one oblique image captures all of the area of interest.

3. The system as claimed in claim 2, wherein:
the at least one processor is configured to navigate the UV and position the camera to obtain the nadir and oblique images.

4. The system as claimed in claim 2, wherein:
the at least one processor is configured to navigate the UV and position the camera at an aerial distance above a ground position of a corner of the perimeter to obtain the at least one oblique image; and
the image data are obtained from the nadir images without using the at least one oblique image.

5. The system as claimed in claim 4, wherein the oblique images are taken at the same plane as the nadir images.

6. The system as claimed in claim 4, wherein the at least one processor is configured to receive navigation and image obtaining instructions from a UV controller.

7. The system as claimed in claim 4, wherein the at least one processor is configured to:
navigate the UV such that the camera is positioned an aerial distance from a first ground position corresponding to the first corner of the perimeter;
yaw the UV and pitch the camera to focus on a centre ground position corresponding to a centre of the area of interest; and
obtain a first oblique image of the area of interest.

8. The system as claimed in claim 4, wherein the at least one processor is configured to:
navigate a flight plan for the UV, the flight plan comprising navigating the UV such that the camera is positioned to capture images from an aerial distance above ground positions of each corner of the perimeter;
at the aerial distance above a ground position of each corner, yaw the UV and pitch the camera to focus on a centre ground position corresponding to the centre of the area of interest; and
at the aerial distance above the ground positions of each corner, obtain separate oblique images of the area of interest from the perspective of each corner position.

9. The system as claimed in claim 1, wherein to obtain the nadir and the at least one oblique images, the at least one processor is configured to receive the nadir and the at least one oblique images;
wherein the at least one oblique image is used to correct relative pixel positions in image data obtained from the nadir images; and
the image data are obtained from the nadir images without using the at least one oblique image.

10. The system as claimed in claim 1, wherein the at least one oblique image is used to correct for bowing in a map of non-flat surfaces or terrain obtained from the nadir images.

11. A computer-implemented method of generating a two-dimensional (2D) map of an area of interest, the method comprising:
determining, by at least one processor, a perimeter of an area of interest;
obtaining, by the at least one processor, nadir images of the area of interest;
obtaining, by the at least one processor, at least one oblique image of the area of interest from at least one corner of the perimeter; and
processing, by the at least one processor, the nadir and oblique images together to form the 2D map of the area of interest, the at least one oblique image being used to correct distortions in image data obtained from the nadir images, wherein:
at least two of the nadir images overlap; and
the at least one oblique image is used to correct distortions introduced by stitching of the overlapping nadir images.

12. The method as claimed in claim 11, comprising controlling, by the at least one processor, the camera on the UV to obtain the nadir and oblique images;
wherein the at least one oblique image is used to correct relative pixel positions in image data obtained from the nadir images; and
wherein the image data are obtained from the nadir images without using the at least one oblique image.

13. The method as claimed in claim 12, comprising navigating, by the at least one processor, the UV and the camera to obtain the nadir and oblique images;
wherein each of the nadir images captures a portion of the area of interest, and the at least one oblique image captures all of the area of interest.

14. The method as claimed in claim 12, comprising navigating the UV and positioning the camera, by the at least one processor, an aerial distance above a ground position of a corner of the perimeter to obtain the at least one oblique image.

15. The method as claimed in claim 14, wherein the oblique images are taken at the same plane as the nadir images.

16. The method as claimed in claim 14, comprising receiving, by the at least one processor, navigation and image obtaining instructions from a UV controller;
wherein the image data are obtained from the nadir images without using the at least one oblique image.

17. The method as claimed in claim 14, comprising:
navigating, by the at least one processor, the UV such that the camera is positioned an aerial distance from a first ground position corresponding to a first corner of the perimeter;
yawing the UV and pitching the camera, by the at least one processor, to focus on a centre ground position corresponding to a centre of the area of interest; and
obtaining, by the at least one processor, a first oblique image of the area of interest.

18. The method as claimed in claim 14, comprising:
navigating, by the at least one processor, a flight plan for the UV, the flight plan comprising navigating the UV such that the camera is positioned to capture images from an aerial distance above ground positions of each corner of the perimeter;
at the aerial distance above a ground position of each corner, yawing the UV and pitching the camera, by the at least one processor, to focus on a centre ground position corresponding to the centre of the area of interest; and
at the aerial distance above the ground positions of each corner, obtaining, by the at least one processor, separate oblique images of the area of interest from the perspective of each corner position.

19. The method as claimed in claim 11, wherein obtaining the nadir and the at least one oblique image comprises receiving the nadir and the at least one oblique image; and
   the at least one oblique image is used to correct for bowing in a map of non-flat surfaces or terrain obtained from the nadir images.

20. A non-transitory computer readable medium for storing instructions which when executed by at least one processor configure the at least one processor to:
   determine a perimeter of an area of interest;
   obtain nadir images of the area of interest;
   obtain at least one oblique image of the area of interest from at least one corner of the perimeter; and
   stitch the nadir and oblique images together to form the 2D map of the area of interest, the at least one oblique image being used to correct distortions introduced by the stitching in image data obtained from the nadir images.

* * * * *

UNITED STATES PATENT AND TRADEMARK OFFICE
CERTIFICATE OF CORRECTION

PATENT NO. : 11,566,894 B2
APPLICATION NO. : 17/070845
DATED : January 31, 2023
INVENTOR(S) : April Deirdre Blaylock, Richard Patrick Ribeiro Cunha and Kuan-Yao Huang It is certified that error appears in the above-identified patent and that said Letters Patent is hereby corrected as shown below:

In the Specification

Column 12, Line 34, change "wireless (e.g., WMAX)," to -- wireless (e.g., Wi-Fi WiMAX) --.

Column 14, Line 40, change "wireless (e.g., WMAX)," to -- wireless (e.g., Wi-Fi WiMAX) --.

Signed and Sealed this
Fourteenth Day of March, 2023

Katherine Kelly Vidal
*Director of the United States Patent and Trademark Office*